Patented July 10, 1934

1,966,327

UNITED STATES PATENT OFFICE 1,966,327

PROCESS OF COLORING ORGANIC CELLULOSE ESTER PLASTICS

Robert Odiorne Wood, Rochester, N. Y., assignor to Eastman Kodak Company, Rochester, N. Y., a corporation of New York No Drawing. Application December 23, 1931, Serial No. 582,886

11 Claims. (Cl. 106—40)

This invention relates to cellulose acetate plastics and more particularly to a process for coloring or dyeing cellulose acetate molded products made from uncolloidized cellulose acetate in the form of comminuted molding powders.

It is known that both cellulose nitrate and cellulose acetate may be colloidized by means of solvents containing methyl alcohol, and, since methyl alcohol is probably the best known solvent for the spirit-soluble dyestuffs, there is no problem presented in the coloring or dyeing of either colloidized cellulose nitrate or colloidized cellulose acetate. In coloring plastics produced from this type of material, the dye is readily dispersed during the operation in which the ester is colloidized by means of the solvent.

A serious drawback in this type of plastic working with these colloidized materials is that the solvent must be removed from the product by means of relatively expensive operations. For example, the plastic material must first be treated by prolonged working on steam heated plastic rolls. This operation drives off about 75% of the solvent, leaving the material in the form of a colored rough sheet containing a relatively high percentage of residual solvent. A number of such sheets, usually about one inch thick, are stacked together to give the required thickness in a blocking mold. This mold is generally steam heated and when placed in a suitable hydraulic press, it is possible, under the influence of hydraulic pressure and heat, to unite the several rough sheets into one homogeneous block, but it is evident that this block still contains a large amount of residual solvent. After the block has cooled, it is shaved or "skived" into sheets of any desired thickness. In order to remove the remaining solvent, however, it is necessary to hang these sheets up in a drying house for a period of from 10 days to three months, according to their thickness.

In contradistinction to the above type of colloidized material, there is the type which is known as molding powders. This latter type of material is uncolloidized and consists simply in particles of comminuted, dry cellulose acetate, or other cellulose organic ester, and plasticizer which have been ground by any one of a number of different processes to a fineness comparable to that of flour. It is important to note at this point that molding powders are not made from cellulose nitrate owing to its extreme inflammability and explosiveness. The only cellulose ester which has thus far been generally successful for the production of these molding powders is cellulose acetate and it is with this compound in its uncolloidized form that the present invention is principally concerned, although the invention is also applicable to other cellulose single organic esters, such as cellulose propionate, butyrate, laurate, stearate, and the like, and to cellulose mixed organic esters, such as cellulose acetate propionate, acetate butyrate, acetate stearate, propionate, butyrate, and the like.

It is a well-known fact that cellulose acetate is not readily dyed by the usual types of dyes. Those dyes which have been developed for cellulose acetate include but very few colors which approach the beauty and brilliancy of the spirit-soluble types. In order, then, to color cellulose acetate molded articles, it is necessary to incorporate the dye in some other component of the molded object than in the cellulose acetate itself.

I have now discovered a process wherein the uncolloidized type of cellulose acetate above referred to may be successfully colored. My process is one wherein the spirit-soluble dyes heretofore considered suitable only for the coloring of cellulose nitrate plastic products may be successfully applied to the coloring of molded objects produced from cellulose acetate molding powders and wherein the introduction of low boiling solvents is avoided. My invention, therefore, has for its principal object to overcome the above-mentioned prior art difficulties, especially to do away with the necessity for the prolonged and extensive procedure necessary for removing the residual solvents heretofore employed, and to provide a simple and effective means for incorporating a dye into cellulose acetate plastic compositions. A specific object of the invention is to provide a process for utilizing the spirit-soluble dyes for this purpose. Other objects will hereinafter appear.

Stated in its simplest terms, my invention may be said to be based upon the discovery that certain of the compounds ordinarily used for plasticizing cellulose acetate possess the remarkable and unexpected property of being excellent solvents for the spirit-soluble dyes and that plastic products made from uncolloidized cellulose acetate in the form of molding powders may be dyed or colored simply by first dyeing the plasticizer and then adding the dyed plasticizer solution to the cellulose acetate. I have found that ethyl para-toluene sulfonamide, for example, is particularly valuable for this purpose and have also employed triacetin with satisfactory results. My process consists simply in making up a solution of a given spirit-soluble dye, such as rhodamine BX, for example, in a given cellulose acetate plasticizer and incorporating this colored plasticizer solution into the molding composition. The molding operation is then carried out according to the customary practice, the temperature and molding pressures being controlled in a manner well known to those skilled in the art.

In the following example, I have set forth one of the preferred embodiments of my invention which is included merely for purposes of illustration and not as a limitation:

15 grams of ethyl para-toluene sulfonamide and 15 grams of diethyl phthalate are melted together. One fourth of a gram of rhodamine BX is thoroughly mixed with the molten solution. This plasticizer solution of dye is then added to 100 grams of cellulose acetate which has been previously thoroughly ground in a pebble mill. After the addition of the dye and plasticizer, the pebble mill is run for a period of several hours, after which the molding powder is found to be thoroughly homogeneous and uniformly colored. The plasticized mass is then molded at 145° C. under a pressure of 2500 pounds per square inch and cooled to 80° C. under pressure. The resulting molded product has an unusual color effect which, by transmitted light is a bluish-pink, while by reflected light displays a strong orange fluorescence.

Instead of employing a cellulose acetate which has been reduced to a finely divided condition by a grinding operation, a finely divided precipitated porous granular form of cellulose acetate, such as that prepared in accordance with the disclosure contained in the copending application of Dennis E. Northrup and Amos W. Crane, Serial No. 551,508, filed July 17, 1931, may be employed. The only pre-requisite with respect to the type of material is that it shall be reduced to a sufficiently finely divided condition as to permit the thorough incorporation of the plasticizer and its complete permeation by the coloring matter.

The above example is, of course, intended to be merely illustrative, and it is to be understood that many changes in the specific mode of operation may be made within the scope of my invention.

For example, spirit-soluble dyes of the triphenyl methane type other than rhodamine BX may be employed with good results. For example, I have found alphazurine FG and other similar dyes suitable for this purpose.

With regard to the plasticizer in which the dye is dissolved, I intend to include within the scope of my invention all such substances as are satisfactory plasticizers for cellulose acetate and which are at the same time good solvents for the spirit-soluble dyes. As pointed out above, I have found that triacetin gives satisfactory results when used for this purpose.

I may employ a single plasticizer as the dye solvent or a mixture of plasticizers. I may also mix therewith other plasticizers which may or may not themselves be solvents for the dye-stuff. Among plasticizers of the latter class may be mentioned diethyl phthalate, dimethyl phthalate, monochlornaphthalene, triphenyl phosphate, tricresyl phosphate, ethyl acetanilide, penta erithritol, hexachlorobenzene, thymol and chloretone.

The dyed plastic mass may also have included therein if desired inert filling substances such as zinc oxide, barium sulphate or equivalent filling materials.

The details of the molding operation will vary widely since they are largely a matter of selection. It may be said, however, that 145° C. is a satisfactory molding temperature, although the temperature may be considerably in excess of this figure and may go as high as 160° C. in some cases.

A wide latitude is also permissible in the application of pressure in the molding operation and this will vary according to the nature of the article to be produced. While I have described a process in which the article is cooled under pressure in the mold, this is not an essential feature, and may be dispensed with if desired.

While I have described my invention with particular reference to the incorporation of dyes into uncolloidized cellulose acetate, my process is equally applicable to the coloring of plastic compositions made from molding powders consisting of uncolloidized particles of the higher single or mixed esters of cellulose, such as cellulose propionate, cellulose butyrate, cellulose stearate, cellulose acetate propionate, cellulose acetate butyrate, and cellulose acetate stearate and so on, since those plasticizers which are solvents for the spirit-soluble dyes and plasticizers for cellulose acetate may be used as plasticizers for these higher single or mixed esters.

It is evident that my process constitutes a distinct advance in the art of producing cellulose acetate and other cellulose organic ester plastic products in that it provides a means for utilizing the heretofore unavailable spirit-soluble dyes in the coloring of these products. It has eliminated the necessity of first forming these molded objects in a soft and pliable condition containing relatively large amounts of low-boiling solvents which must be subsequently removed by extensive curing operations. Its simplicity and the fact that it requires no solvent compounds in addition to the usual ingredients of a cellulose acetate molding composition gives rise to a considerable saving in materials and the time usually consumed in the ordinary methods of introducing coloring material into this type of product.

As many apparently widely different embodiments of this invention may be made without departing from the spirit and scope thereof, it is to be understood that I do not limit myself to the specific embodiments thereof except as defined in the appended claims.

What I claim as new and desire to be secured by Letters Patent of the United States is:

1. The process of coloring a cellulose organic ester plastic which comprises dissolving a dye in a plasticizer for the cellulose ester and thereafter incorporating the dye solution with the uncolloidized cellulose ester.

2. The process of coloring a mixed cellulose organic ester plastic which comprises dissolving a dye in a plasticizer for the mixed ester and thereafter incorporating the dye solution with the mixed ester in its uncolloidized form.

3. The process of coloring a mixed cellulose organic ester plastic which comprises dissolving a spirit-soluble dye in a plasticizer for the mixed ester and thereafter incorporating a plasticizing amount of the dyed plasticizer with the mixed ester in its uncolloidized form.

4. The process of simultaneously coloring and plasticizing a cellulose acetate plastic which comprises dissolving a spirit-soluble dye in a molten plasticizer for the cellulose acetate and thereafter incorporating the dyed plasticizer with the uncolloidized cellulose acetate.

5. The process of coloring a cellulose acetate plastic which comprises dissolving a rhodamine dye in a molten mixture of ethyl para-toluene sulfonamide and diethyl phthalate and thereafter mixing the dye solution with finely divided uncolloidized cellulose acetate.

6. The process of simultaneously coloring and plasticizing a cellulose acetate plastic which comprises dissolving a dye in a plasticizer for the cellulose acetate and then incorporating the dyed plasticizer with the cellulose acetate in its uncolloidized form.

7. The process of simultaneously coloring and plasticizing a cellulose acetate plastic which comprises dissolving a dye in a plasticizer for the cellulose acetate and then incorporating the dyed plasticizer with uncolloidized cellulose acetate in the form of a molding powder the particles of which have an open porous granular structure.

8. The process of simultaneously coloring and plasticizing a cellulose organic ester plastic which comprises dissolving a dye in a plasticizer for the cellulose organic ester and then incorporating the plasticizer solution of dye with finely divided uncolloidized organic ester.

9. The process of simultaneously coloring and plasticizing a cellulose acetate plastic which comprises dissolving a dye in a plasticizer for the cellulose acetate and then incorporating the plasticizer solution of dye with finely divided uncolloidized cellulose acetate.

10. The process of simultaneously coloring and plasticizing a cellulose organic ester plastic which comprises dissolving a dye in a plasticizer for the cellulose organic ester, then incorporating the plasticizer solution of dye with finely divided uncolloidized organic ester and colloidizing the entire mass under heat and pressure.

11. The process of simultaneously coloring and plasticizing a cellulose acetate plastic which comprises dissolving a dye in a plasticizer for the cellulose acetate, then incorporating the plasticizer solution of dye with finely divided uncolloidized cellulose acetate and colloidizing the entire mass under heat and pressure.

ROBERT ODIORNE WOOD.

CERTIFICATE OF CORRECTION.

Patent No. 1,966,327.

July 10, 1934.

ROBERT ODIORNE WOOD.

It is hereby certified that error appears in the printed specification of the above numbered patent requiring correction as follows: Page 2, line 69, after the syllable "tol" insert the word acetate; and that the said Letters Patent should be read with this correction therein that the same may conform to the record of the case in the Patent Office.

Signed and sealed this 11th day of September, A. D. 1934.

Leslie Frazer (Seal)

Acting Commissioner of Patents.

dye in a molten mixture of ethyl para-toluene sulfonamide and diethyl phthalate and thereafter mixing the dye solution with finely divided uncolloidized cellulose acetate.

6. The process of simultaneously coloring and plasticizing a cellulose acetate plastic which comprises dissolving a dye in a plasticizer for the cellulose acetate and then incorporating the dyed plasticizer with the cellulose acetate in its uncolloidized form.

7. The process of simultaneously coloring and plasticizing a cellulose acetate plastic which comprises dissolving a dye in a plasticizer for the cellulose acetate and then incorporating the dyed plasticizer with uncolloidized cellulose acetate in the form of a molding powder the particles of which have an open porous granular structure.

8. The process of simultaneously coloring and plasticizing a cellulose organic ester plastic which comprises dissolving a dye in a plasticizer for the cellulose organic ester and then incorporating the plasticizer solution of dye with finely divided uncolloidized organic ester.

9. The process of simultaneously coloring and plasticizing a cellulose acetate plastic which comprises dissolving a dye in a plasticizer for the cellulose acetate and then incorporating the plasticizer solution of dye with finely divided uncolloidized cellulose acetate.

10. The process of simultaneously coloring and plasticizing a cellulose organic ester plastic which comprises dissolving a dye in a plasticizer for the cellulose organic ester, then incorporating the plasticizer solution of dye with finely divided uncolloidized organic ester and colloidizing the entire mass under heat and pressure.

11. The process of simultaneously coloring and plasticizing a cellulose acetate plastic which comprises dissolving a dye in a plasticizer for the cellulose acetate, then incorporating the plasticizer solution of dye with finely divided uncolloidized cellulose acetate and colloidizing the entire mass under heat and pressure.

ROBERT ODIORNE WOOD.

CERTIFICATE OF CORRECTION.

Patent No. 1,966,327.

July 10, 1934.

ROBERT ODIORNE WOOD.

It is hereby certified that error appears in the printed specification of the above numbered patent requiring correction as follows: Page 2, line 69, after the syllable "tol" insert the word acetate; and that the said Letters Patent should be read with this correction therein that the same may conform to the record of the case in the Patent Office.

Signed and sealed this 11th day of September, A. D. 1934.

Leslie Frazer (Seal)

Acting Commissioner of Patents.